US008850126B2

(12) United States Patent  
Prabhu et al.

(10) Patent No.: US 8,850,126 B2  
(45) Date of Patent: Sep. 30, 2014

(54) EXCLUSIVE ACCESS DURING A CRITICAL SUB-OPERATION TO ENABLE SIMULTANEOUS OPERATIONS

(75) Inventors: Vasantha Prabhu, Bangalore (IN); Gaurab Paul, Bangalore (IN); Rushi Srinivas Surla, Bangalore (IN); Ritesh Tiwari, Bangalore (IN)

(73) Assignee: Netapp, Inc., Sunnyvale, CA (US)

( * ) Notice: Subject to any disclaimer, the term of this patent is extended or adjusted under 35 U.S.C. 154(b) by 723 days.

(21) Appl. No.: 12/684,122

(22) Filed: Jan. 8, 2010

(65) Prior Publication Data

US 2011/0173356 A1  Jul. 14, 2011

(51) Int. Cl.  
*G06F 13/00* (2006.01)  
*G06F 9/52* (2006.01)

(52) U.S. Cl.  
CPC .......... *G06F 9/526* (2013.01); *G06F 2209/523* (2013.01)  
USPC .................... 711/141; 711/162; 711/E12.098

(58) Field of Classification Search  
USPC ....................................................... 711/150  
See application file for complete search history.

(56) References Cited

U.S. PATENT DOCUMENTS

| 5,568,634 | A  | * | 10/1996 | Gordons ................... 711/170 |
| 6,922,745 | B2 | * | 7/2005  | Kumar et al. ............... 710/200 |
| 7,076,509 | B1 | * | 7/2006  | Chen et al. ..................... 1/1 |
| 7,103,740 | B1 | * | 9/2006  | Colgrove et al. ............ 711/162 |
| 7,437,612 | B1 | * | 10/2008 | Cantrill ........................ 714/37 |
| 7,441,029 | B2 | * | 10/2008 | Kano et al. .................. 709/225 |
| 7,571,439 | B1 | * | 8/2009  | Rabinovici et al. .......... 718/104 |
| 2003/0097396 | A1 | * | 5/2003  | Zhang et al. ................. 709/104 |
| 2004/0133607 | A1 | * | 7/2004  | Miloushev et al. .......... 707/200 |
| 2004/0143712 | A1 | * | 7/2004  | Armstrong et al. .......... 711/152 |
| 2005/0268068 | A1 | * | 12/2005 | Ignatius et al. .............. 711/202 |
| 2005/0289549 | A1 | * | 12/2005 | Cierniak et al. ............. 718/102 |
| 2006/0206677 | A1 | * | 9/2006  | Kim et al. .................... 711/162 |
| 2009/0049259 | A1 | * | 2/2009  | Sudhakar ..................... 711/162 |
| 2010/0088476 | A1 | * | 4/2010  | Inagaki et al. ............... 711/152 |
| 2010/0333096 | A1 | * | 12/2010 | Dice et al. ................... 718/102 |

* cited by examiner

*Primary Examiner* — Sean D Rossiter  
(74) *Attorney, Agent, or Firm* — Klein, O'Neill & Singh, LLP

(57) ABSTRACT

A method, apparatus, and system of exclusive access during a critical sub-operation to enable simultaneous operations are disclosed. In one embodiment, a method of a host device includes identifying a critical sub-operation of an operation associated with a storage system, applying a lock associated with the critical sub-operation based on a type of the sub-operation, providing exclusive access of the critical sub-operation to a first instance requiring the critical sub-operation, denying other instances access to the critical sub-operation during an interval comprising a period when the first instance executes the critical sub-operation, and releasing the lock when the critical sub-operation is no longer required by the first instance. The first instance and the other instances may originate on different host devices.

24 Claims, 12 Drawing Sheets

| OPERATIONS 400 | SUB-OPERATIONS 402 | LOCK TYPES 404 |
|---|---|---|
| PROVISIONING 406 | STORAGE LUN CREATION 416 | NONE |
| | HOST MAPPING 418 | 🚌 |
| | LUN DISCOVERY 420 | 🚌 |
| | HOST ENTITY ACTIVATION 422 | 💼 |
| BACKUP 408 | HOST ENTITY TRANSLATION 424 | NONE |
| | HOST ENTITY FREEZE 426 | 💼 |
| | SNAPSHOT META-DATA MANAGEMENT 428 | 🧤 |
| | SNAPSHOT CREATION 430 | NONE |
| | HOST ENTITY UNFREEZE 432 | 💼 |
| RESTORE 410 | HOST ENTITY TRANSLATION 434 | NONE |
| | HOST ENTITY DEACTIVATION 436 | 💼 |
| | SNAPSHOT RESTORE 438 | NONE |
| | HOST MAPPING 440 | 🚌 |
| | LUN DISCOVERY 442 | 🚌 |
| | HOST ENTITY ACTIVATION 444 | 💼 |
| CLONE 412 | HOST ENTITY TRANSLATION 446 | NONE |
| | SNAPSHOT META-DATA MANAGEMENT 448 | 🧤 |
| | CLONE CREATION 450 | NONE |
| | HOST MAPPING 452 | 🚌 |
| | LUN DISCOVERY 454 | 🚌 |
| | HOST ENTITY ACTIVATION 456 | 💼 |
| DELETE 414 | HOST ENTITY TRANSLATION 458 | NONE |
| | HOST ENTITY DEACTIVATION 460 | 💼 |
| | HOST UN-MAPPING 462 | 🚌 |
| | STORAGE DELETION 464 | NONE |
| | LUN DISCOVERY 466 | 🚌 |

FIGURE 4

EXCLUSIVE ACCESS DURING A CRITICAL SUB-OPERATION TO ENABLE SIMULTANEOUS OPERATIONS

FIELD OF TECHNOLOGY

This disclosure relates generally to a field of storage technology and, in one example embodiment, to a method, apparatus, and system of exclusive access during a critical sub-operation to enable simultaneous operations.

BACKGROUND

A user of a host device (e.g., a UNIX® server, a Linux® server, a Microsoft® Windows server, an Apple® server) may initiate an operation on a volume (e.g., a storage entity) of a storage system. For example, the operation initiated by the user may be a provisioning operation, a snapshot operation, and/or a cloning operation. The storage system may be accessible by the host device through a Storage Area Network (SAN). Alternatively, the storage system may be accessible by the host device directly as a Network Attached Storage (NAS) device.

When multiple instances (e.g., processes, threads) initiate operations (e.g., provisioning, restoring, cloning, backing up, deleting) associated with the storage system (e.g., host device side, storage system side) at the same time (e.g., simultaneously), problems may occur. For example, a command issued by a particular instance of the host device may cause interference with other operations issued by different instances. As a result, the operations issued by multiple users may fail and important data may be lost. In addition, a snapshot (e.g., a backup at a point in time) of the volume of the storage system may be left in an invalid state. Locking techniques may not sufficiently take into account resources of the host device. Furthermore, locking techniques may not take into account the volume of the storage system and when the operations are performed serially, this may cause performance degradation and latency.

SUMMARY

A method, apparatus, and system of exclusive access during a critical sub-operation to enable simultaneous operations are disclosed. In one aspect, a method of a device includes identifying a critical sub-operation of an operation associated with a storage system, applying a lock associated with the critical sub-operation based on a type of the critical sub-operation, providing exclusive access of the critical sub-operation to a first instance requiring the critical sub-operation, denying other instances access to the critical sub-operation during an interval that includes a period when the first instance executes the critical sub-operation, and releasing the lock when the critical sub-operation is no longer required by the first instance. The first instance and the other instances may originate on different host devices. The operation described herein may include one or more critical sub-operations and/or one or more non-critical sub-operations.

The operation associated with the storage system may be a host device operation and/or a storage system operation. In addition, the operation may be a provisioning operation, a backup operation, a restore operation, a clone operation, and/or a delete operation. The method may determine that a certain sub-operation is a non-critical sub-operation, and may execute the certain sub-operation concurrently when multiple instances simultaneously perform the operation.

Different locks may be applied on the critical sub-operation. For example, when the type of the critical sub-operation is a snapshot meta-data management sub-operation, the lock applied on a volume of the storage system may be a snap lock. Alternatively, when the type of the critical sub-operation is a mapping sub-operation, a Logical Unit Number (LUN) discovery sub-operation, or a host un-mapping sub-operation, the lock applied on the host device may be a bus lock. When the type of the critical sub-operation is a host entity activation sub-operation, a host entity freeze sub-operation, a host entity unfreeze sub-operation, and/or a host entity deactivation sub-operation, the lock applied on the host device may be a filespec lock.

For non-critical sub-operations, no lock may be applied. For example, when the type of the sub-operation is a storage creation sub-operation, a host entity translation sub-operation, a snapshot restore sub-operation, and/or a storage deletion sub-operation, no lock may be applied on the host device or the storage system.

The storage system may include a non-volatile storage such as a Redundant Array of Independent Disks (e.g., RAID system), one or more hard drives, one or more flash drives and/or one or more arrays. The storage system may be communicatively coupled to the host device as a Network Attached Storage (NAS) device, a Storage Area Network (SAN) device, and/or as a Direct Attached Storage (DAS) device.

In another aspect, a method executed by a processor includes determining which modules of an operation associated with a storage system need to be individually executed by instances of a host device and determining which modules of the operation associated with the storage system are executable concurrently. Then, responsive to an incoming operation of an instance of a first host device, the method includes individually executing modules of the incoming operation that need to be individually executed. Responsive to another operation of another instance the first host device and/or a different host device, the method includes denying the other instance access to the modules individually being executed by the instance of the first host device and permitting concurrent access by the instance and the other instance to the modules that are executable concurrently.

In yet another aspect, a system includes a host device to apply an appropriate exclusive lock on a sub-operation of an operation based on a type of the sub-operation, a network, and a storage system communicatively coupled to the host device through the network to provide data to the host device based on a rule associated with the exclusive lock. The rule associated with the exclusive lock may determine whether the exclusive lock is to be placed on sub-operations of the host device and/or the storage system. The rule may define which module associated with the operation requires exclusive access by different instances, and which module associated with the operation is executable concurrently.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 4 is a table view of various operations, sub-operations and lock types, according to one embodiment.

Other features of the present embodiments will be apparent from the accompanying drawings and from the detailed description that follows.

DETAILED DESCRIPTION

A method, apparatus, and system of exclusive access during a critical sub-operation to enable simultaneous operations are disclosed. Although the present embodiments have been described with reference to specific example embodiments, it will be evident that various modifications and changes may be made to these embodiments without departing from the broader spirit and scope of the various embodiments.

Figure 1:
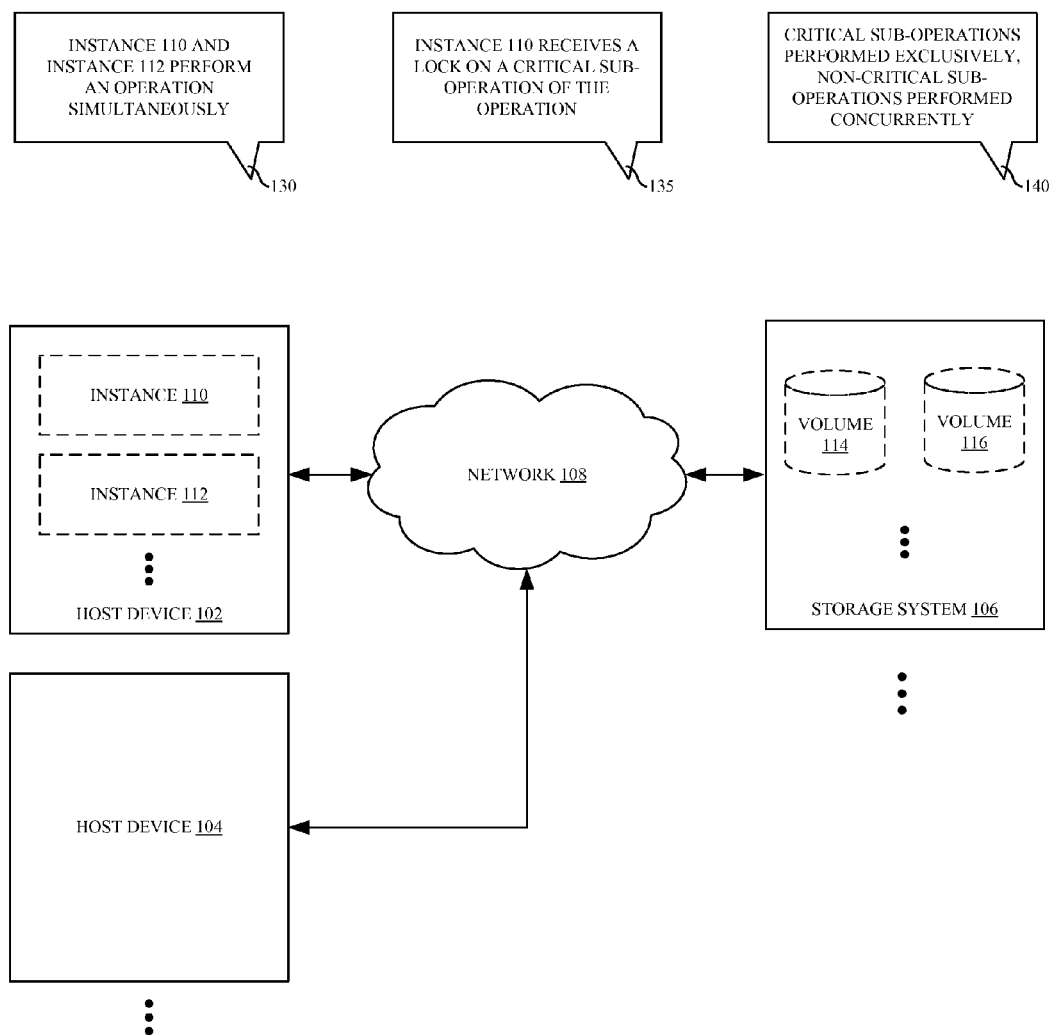
FIG. 1 is a system view of host devices communicating with a storage system through a network, according to one embodiment.

FIG. 1 illustrates a host device 102 and a host device 104 communicating with a storage system 106 through a network 108. The host device 102 and the host device 104 may be data processing systems that perform operations on the storage system 106. The host device 102 includes an instance 110 and an instance 112 in the embodiment illustrated in FIG. 1. The storage system 106 includes a volume 114 and a volume 116 in the embodiment illustrated in FIG. 1.

The host devices 102 and 104 may be general-purpose computers configured to execute applications, such as database applications. Moreover, the host devices 102 and 104 may interact with the storage system 106 in accordance with a client/server information delivery model. For example, the host device 102 may request the services of the storage system 106, and the storage system 106 may return the results of the services requested by the host device 102 by exchanging packets defined by an appropriate networking protocol.

Figure 2:
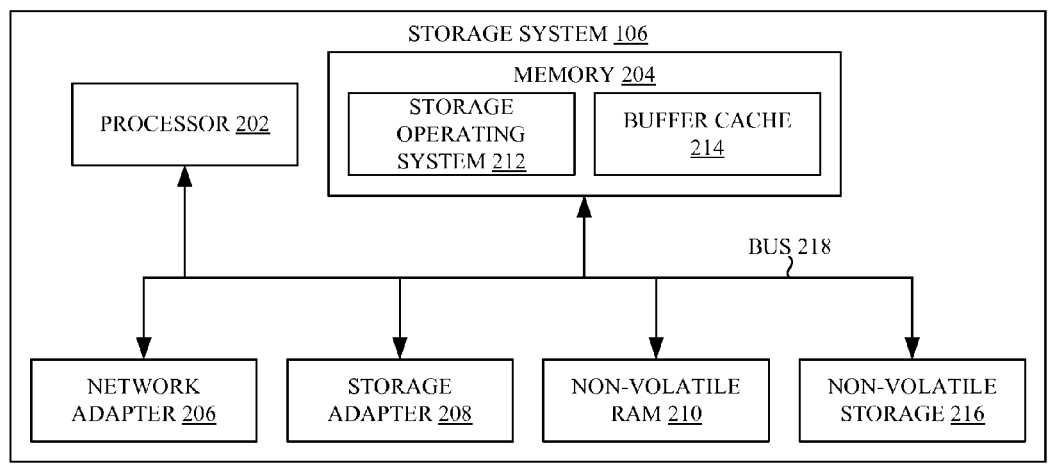
FIG. 2 is an exploded view of the storage system illustrated in FIG. 1, according to one embodiment.

The network 108 may be a Storage Area Network (SAN). For the purposes of this description, the term "network" may include any acceptable network architecture. The network 108 may interconnect a number of clients (e.g., the host devices 102 and 104) to the storage system 106. The storage system 106 may be configured to control storage of data and access to data that is located in the non-volatile storage 216 (as illustrated in FIG. 2) of the storage system 106.

In some embodiments, the network 108 may be a local area network (LAN), a wide area network (WAN), a virtual private network (VPN) using communication links over the Internet, for example, or any combination of network types. The storage system 106 may directly communicate with the host device 102 and the host device 104 as a Network Attached Storage (NAS) device or as a Direct Attached Storage (DAS) device. The storage system 106 may operate in a hybrid SAN-NAS environment. For example, the storage system 106 may offer file-serving capabilities and also serve blocks over a Fibre Channel SAN.

The principles of various embodiments described herein are applicable to any type of NAS device running any type of operating system. For example, a NAS device can include the NearStore® storage system running the NetApp® Data ONTAP® operating system available from NetApp, Inc., Sunnyvale, Calif. Further, the principles of the various embodiments are applicable to any type of SAN.

It should be noted that the storage system 106 of FIG. 1 may also operate as a file server (also called a "filer"). For example, the storage system 106 may include a computer that provides file services relating to an organization of information on storage devices, such as non-volatile storage 216 as illustrated in FIG. 2. The storage system 106 may include a storage operating system 212 (as illustrated in FIG. 2) that implements a file system to logically organize the information as a hierarchical structure of directories and files on the non-volatile storage 216 (as shown in FIG. 2).

Each "on-storage" file (e.g., on the non-volatile storage 216 of FIG. 2) may be implemented as a set of non-volatile storage blocks configured to store information, such as text, whereas the directory may be implemented as a specially-formatted file in which information about other files and directories are stored. The storage system 106 may be configured to operate according to the client/server model of information delivery to thereby allow many clients to access files stored on a server, e.g., the storage system 106.

In this model, the client (e.g., the host device 102 of FIG. 1) may include an application, such as a file system protocol, executing on a computer that communicates with storage system 106 over a computer network (e.g., the network 108), such as a point-to-point link, shared LAN, WAN or VPN implemented over a public network such as the Internet. Each host device (e.g., the host device 102, the host device 104) may request the services of the storage system 106 by issuing file system protocol messages (in the form of packets) to the storage system 106 over the network 108.

A type of file system implemented in storage system 106 according to one embodiment is a "write in-place" file system, an example of which is the Berkeley fast file system. In a write in-place file system, the locations of the data structures, such as inodes and data blocks, on non-volatile storage 216 of FIG. 2 can be fixed. An inode may be a data structure used to store information about a file, such as meta-data, whereas the data blocks may be structures used to store the actual data for the file. The information included in an inode may include, e.g., ownership of the file, access permission for the file, size of the file, file type, and references to locations on disk of the data blocks for the file. The references to the locations of the file data may be provided by pointers, which may further reference indirect blocks that, in turn, reference the data blocks, depending upon the quantity of data in the file. Changes to the inodes and data blocks may be made "in-place" in accordance with the write in-place file system. If an update to a file extends the quantity of data for the file, an additional data block can be allocated and the appropriate inode may be updated to reference that data block.

Another type of file system implemented in storage system 106 according to one embodiment is a "write-anywhere" or "copy on write" file system (or the like) that does not overwrite data on disks. If a data block on disk is retrieved (read) from disk into memory and "dirtied" with new data, the data block may be stored (written) to a new location on disk to thereby optimize write performance. A write-anywhere file system may initially assume an optimal layout such that the data is substantially contiguously arranged on disks. The optimal disk layout may result in efficient access operations, particularly for sequential read operations, directed to the non-volatile storage 216 of FIG. 2. A particular example of a write-anywhere file system that can be configured to operate on the storage system 106 according to one embodiment is the Write Anywhere File Layout (WAFL®) file system available from NetApp, Inc. The WAFL® file system can be implemented within a microkernel as part of the overall protocol stack of the filer and associated disk storage. This microkernel may be supplied as part of NetApp' s Data ONTAP® storage operating system, which can reside on the storage system 106, and can process file-service requests from network-attached clients.

As used in various embodiments, the term "storage operating system" (e.g., as illustrated in FIG. 2) may refer to the computer-executable code operable on the storage system 106 that manages data access and may implement file system semantics, such as the Data ONTAP® storage operating system, which can be implemented as a microkernel. The Data ONTAP® storage operating system is available from NetApp, Inc. and implements a file system, such as the Write Anywhere File Layout (WAFL®) file system. According to one embodiment, the storage operating system 212 of FIG. 2 can also be implemented as an application program operating over a general-purpose operating system, such as UNIX® or Windows®, or as a general-purpose operating system with configurable functionality, which is configured for storage applications as described in various embodiments.

Non-volatile storage 216 can be implemented as one or more storage "volumes" that comprise physical storage disks, defining an overall logical arrangement of storage space. Available filer implementations can serve a large number of discrete volumes. The non-volatile storage 216 can be organized as one or more groups of RAID devices. RAID implementations can enhance the reliability/integrity of data storage through the writing of data "stripes" across a given number of physical disks in the RAID group, and the appropriate storing of parity information with respect to the striped data.

In the example of a WAFL® file system, a RAID-4 implementation can be employed, which entails striping data across a group of disks, and storing the parity within a separate disk of the RAID group. As described herein, a volume can include at least one data disk and one associated parity disk (or possibly data/parity) partitions in a single disk arranged according to a RAID-4, or equivalent high-reliability, implementation.

The term "snapshot" is a trademark of NetApp, Inc. and is used for purposes of this description to designate a persistent consistency point (CP) image. A persistent consistency point image (PCPI) may be a point-in-time representation of the filer, and more particularly, of the active file system, stored on a storage device (e.g., on the non-volatile storage 216) or in other persistent memory. A snapshot may have a name or other identifier that distinguishes it from other PCPIs taken at other points in time. A PCPI can also include other information (meta-data) about the active file system at the particular point in time for which the image is taken. The terms "PCPI" and "snapshot" shall be used in this description without derogation of NetApp's trademark rights. For example, a snapshot may be viewed as an example of a read-only reference store. In contrast, the active file system may be viewed as an example of an active store that permits read and write operations.

A snapshot can be viewed as a restorable version of a file system created at a predetermined point in time. Snapshots can be created on a regular schedule. The snapshot may be stored on non-volatile storage along with the active file system, and can be called into the buffer cache 214 of the storage system 106 (as illustrated in FIG. 2) as requested by the storage operating system 212. After a snapshot has been created and file data blocks modified, the storage operating system 212 can reconstruct or "restore" the file system structure as it existed at the time of the snapshot by accessing the snapshot.

Figure 3:
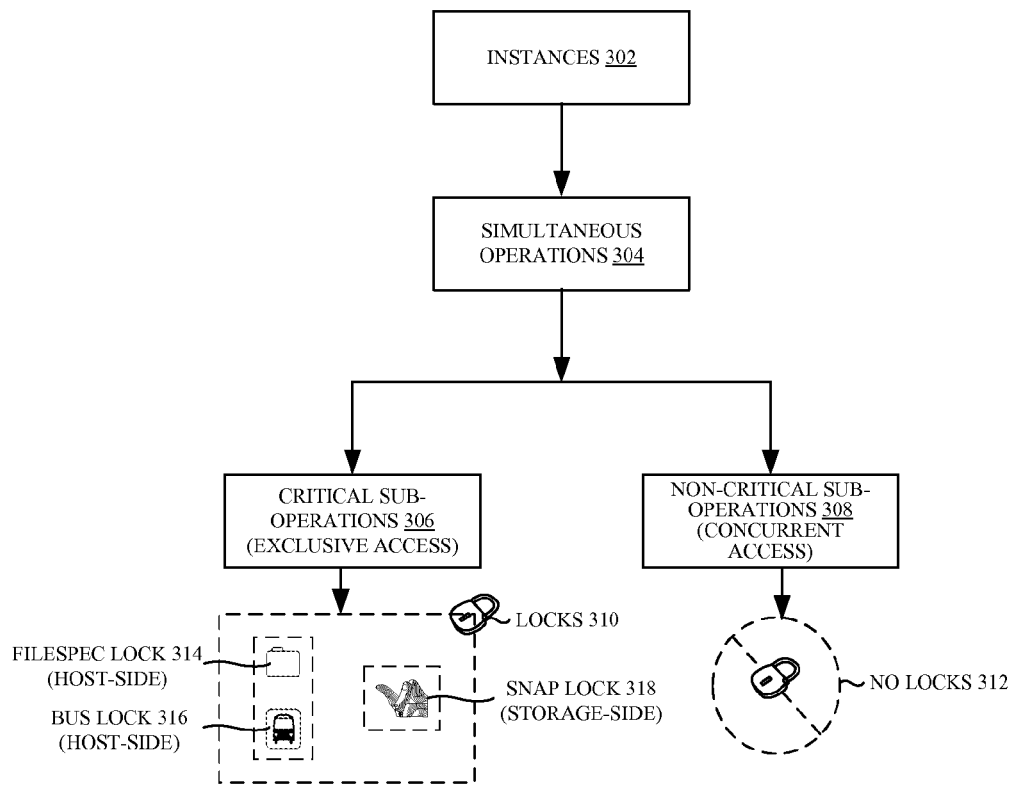
FIG. 3 is a logical flow diagram illustrating locks applied to critical sub-operations when multiple instances perform simultaneous operations, according to one embodiment.

FIG. 1 also illustrates sequences 130, 135, and 140 which are best understood in context of the description of FIGS. 3 and 4. In the sequence 130, instances 110 and 112 of FIG. 1 perform an operation (e.g., one of the five operations described in FIG. 4) simultaneously. Then, in sequence 135, instance 110 of FIG. 1 acquires a lock (e.g., a filespec lock, a bus lock, or a snap lock as described in FIGS. 3 and 4) on a critical sub-operation (as described in FIGS. 3 and 4). Then, in sequence 140 of FIG. 1, critical sub-operations are performed exclusively (as described in FIG. 3) while non-critical sub-operations are performed concurrently (as described in FIG. 3).

FIG. 2 is an exploded view of the storage system 106 illustrated in FIG. 1, according to one embodiment. However, it will be understood by one skilled in the art that the concepts described herein apply to any type of file server and/or storage device, wherever implemented, including on a special-purpose computer, a general-purpose computer, and/or a standalone computer.

The storage system 106 in FIG. 2 includes the processor 202, the memory 204, a network adapter 206, a storage adapter 208, a non-volatile Random Access Memory (RAM) 210, and a non-volatile storage 216, all of which are interconnected by a bus 218. The memory 204 is illustrated as including the storage operating system 212 and the buffer cache 214. The storage operating system 212 may implement a file system to logically organize the information as a hierarchical structure of directories and files on the non-volatile storage 216.

In one embodiment, the memory 204 is addressable by the processor 202 and the adapters 206 and 208 for storing software program code. The storage operating system 212 (e.g., portions of which may be resident in the memory 204 and executed by the processing elements) may functionally organize the storage system 106 by invoking storage operations in support of a file service implemented by the storage system 106.

The network adapter 206 may include mechanical, electrical, and/or signaling circuitry needed to couple the storage system 106 to host devices 102 and 104 over the network 108. The storage adapter 208 may interoperate with the storage operating system 212 and the non-volatile storage 216 locations. For example, the storage adapter 208 may interoperate with the storage operating system 212 and the non-volatile storage 216 locations associated with the volumes 114 and/or 116 to access information requested by an instance 110 of the host device 102 of FIG. 1. The storage adapter 208 may include input/output (I/O) interface circuitry that couples to the non-volatile storage 216 over an I/O interconnect arrangement, such as Fibre Channel. The information may be retrieved by the storage adapter 208 and, if necessary, may be processed by the processor 202 (and/or the storage adapter 208 itself) prior to being forwarded over the bus 218 to the network adapter 206, where the information can be formatted into appropriate packets and returned to the host devices (e.g., the host devices 102 or 104).

In one embodiment as illustrated in FIG. 2, the storage system 106 can include a non-volatile random access memory 210 (NVRAM) that can provide fault-tolerant backup of data, enabling the integrity of filer transactions to survive a service interruption based upon a power failure and/or other fault.

To facilitate the generalized access to the non-volatile storage 216, the storage operating system 212 may implement a file system that logically organizes the information as a hierarchical structure of directories and files on the non-volatile storage 216. Each "on-storage" file (or on-disk file) may be implemented as a set of disk blocks configured to store information, such as data, whereas the directory may be implemented as a specially formatted file in which other files and directories are stored. As noted above, in an exemplary embodiment described herein, the storage operating system 212 is the NetApp® Data ONTAP® operating system available from NetApp, Inc., that implements the write-anywhere file layout (WAFL®) file system. It is noted that any other appropriate file system can be used, and as such, where the terms "WAFL" or "file system" are used, those terms should be interpreted broadly to refer to any file system that is adaptable to the teachings of the various embodiments disclosed herein.

FIG. 3 is a logical flow diagram illustrating that locks are applied to critical sub-operations when multiple instances perform simultaneous operations, according to one embodiment. Particularly, in FIG. 3, instances in block 302 of the host devices 102 and/or 104 are illustrated as performing simultaneous operations in block 304, according to one embodiment.

Figure 5:
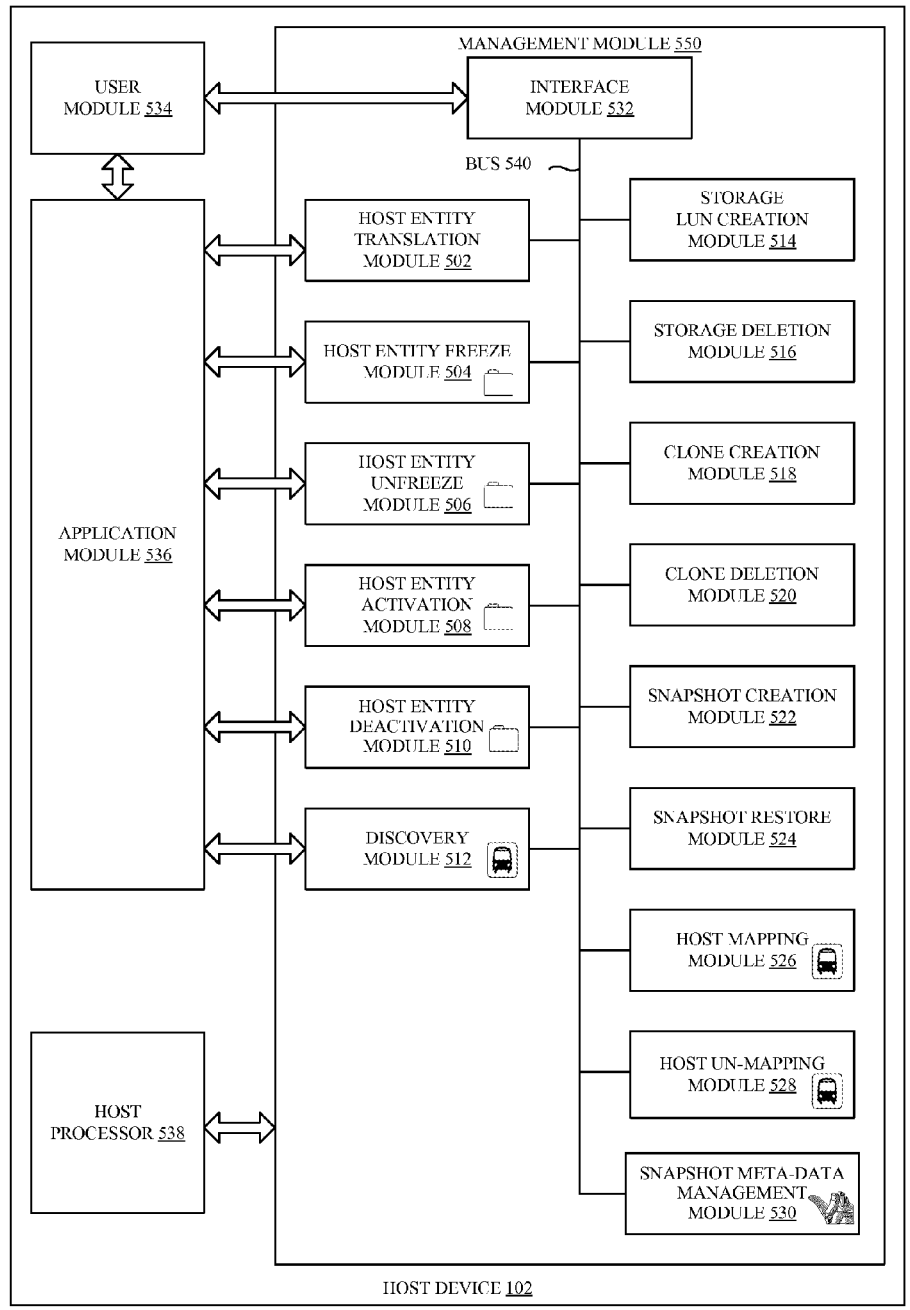
FIG. 5 is an exploded view of a host device that includes a management module, according to one embodiment.

For the purposes of this disclosure, "simultaneous" refers to instances which initiate operations at the same time (e.g., within a small margin of error difference based on a clock rate and speed of the host processor 538 as described in FIG. 5).

Blocks 306 and 308 illustrate that there may be two types of sub-operations associated with each operation, namely, critical sub-operations as shown in block 306 and non-critical sub-operations as shown in block 308, according to one embodiment.

The critical sub-operations described in block 306 are provided exclusive access by a first instance (e.g., earliest requesting instance when the critical sub-operation is idle) requesting the critical sub-operation for a duration of time that the first instance performs the critical sub-operations. To implement exclusive access at the first instance, locks 310 can be used to ensure that only one instance is provided access to a particular critical sub-operation at a particular time.

For the purposes of this disclosure, a "critical" sub-operation refers to a particular portion of an operation (e.g., provisioning, backup, cloning, restore, delete, etc.) must be performed by a single instance in a given period of time to ensure that conflicting reads and/or writes of data do not cause failure of the operation.

In contrast, the non-critical sub-operations are illustrated in block 308. Non-critical sub-operations can be performed concurrently by different instances of host devices (e.g., the host devices 102 and 104) with no locks as shown in indicator 312.

For the purposes of this disclosure, "concurrently" means that the host devices are able to act in conjunction with each other and/or may be able to perform in accordance with each other when accessing and performing the non-critical sub-operation (e.g., are able to act in agreement to access and perform the non-critical sub-operation together without error).

In the embodiment of FIG. 3, three different kinds of locks 310 are illustrated as being associated with critical sub-operations in block 306. Particularly, a filespec lock 314, a bus lock 316 and a snap lock 318 are illustrated in FIG. 3.

Two host-side locks are illustrated in FIG. 3. The filespec lock 314 (shown in as a folder icon for graphical clarity) and the bus lock 316 (shown as a school bus for graphical clarity) are indicated as being host-side locks, meaning that they provide exclusive access to an instance performing a sub-operation on the host devices (e.g., the host devices 102 and/or 104 of FIG. 1). The filespec lock 314 may be used on any critical sub-operation which involves interaction with a module on the host device (e.g., the host device 102) that manages disk groups, host volumes, and file systems. The bus lock 316 may be used on any critical sub-operation which involves a Small Computer Systems Interface (SCSI) transaction.

One storage-side lock is illustrated in FIG. 4. The snap lock 318 (shown as a finger snap icon for graphical clarity) is indicated as being a storage-side lock, meaning that the snap lock 318 provides exclusive access to an instance performing a sub-operation on the storage system 106 of FIG. 1. The snap lock 318 may be used on any operation which involves reading/writing a snapshot meta-data file (e.g., the snapshot meta-data file may include information such as file system, disk group, host volume etc. about host entities) on a particular storage system volume (e.g., the volumes 114 and/or 116 as illustrated in FIG. 1) of the storage system 106. Further, the snap lock 318 can be used even when the instances originate on different host devices. For example, some instances originating on the host device 102 may employ the filespec lock 314 or the bus lock 316. Others originating on the host device 104 may employ the snap lock 318 when performing an operation simultaneously on the storage system 106 of FIG. 1.

FIG. 4 is a table view of operations 400, sub-operations 402 and lock types 404, according to one embodiment. Particularly, five operations are illustrated in FIG. 4, a provisioning operation 406, a backup operation 408, a restore operation 410, a clone operation 412, and a delete operation 414, according to one embodiment. It should be noted that the backup operation 408, the restore operation 410, and the clone operation 412, are sometimes collectively components in the creation of a snapshot (e.g., a PCPI, as discussed previously).

The provisioning operation 406 is illustrated in FIG. 4 as including one non-critical sub-operation (a storage LUN creation sub-operation 416) and three critical sub-operations (a host mapping sub-operation 418, a LUN discovery sub-operation 420, and a host entity activation sub-operation 422), according to one embodiment. The non-critical sub-operation of the provisioning operation 406 does not have a lock type (e.g., 'NONE' indicated under lock types 404), and therefore can be performed concurrently by multiple instances (e.g., the instance 110 and the instance 112 simultaneously performing the provisioning operation 406). In contrast, the host mapping sub-operation 418 and the LUN discovery sub-operation 420 are indicated as having a host-side bus lock 316 as described in FIG. 3, while the host entity activation sub-operation 422 is indicated as including a host-side filespec lock 314 as described in FIG. 3, according to one embodiment.

The backup operation 408 is illustrated in FIG. 4 as including two non-critical sub-operations (a host entity translation sub-operation 424 and a snapshot creation sub-operation 430) and three critical sub-operations (a host entity freeze sub-operation 426, a snapshot meta-data management sub-operation 428, and a host entity unfreeze sub-operation 432), according to one embodiment. The two non-critical sub-operations of the backup operation 408 do not have a lock type (e.g., 'NONE' indicated under lock types 404), and therefore can be performed concurrently by multiple instances (e.g., the instance 110 and the instance 112 simultaneously performing the backup operation 408). In contrast, the host entity freeze sub-operation 426 and the host entity unfreeze sub-operation 432 are indicated as having a filespec lock 314 as described in FIG. 3, while the snapshot meta-data management sub-operation 428 is indicated as including a storage-side snap lock 318 as described in FIG. 3, according to one embodiment.

The restore operation 410 is illustrated in FIG. 4 as including two non-critical sub-operations (a host entity translation sub-operation 434 and a snapshot restore sub-operation 438) and four critical sub-operations (a host entity deactivation sub-operation 436, a host mapping sub-operation 440, a LUN discovery sub-operation 442, and a host entity activation sub-operation 444), according to one embodiment. The two non-critical sub-operations of the restore operation 410 do not have a lock type (e.g., 'NONE' indicated under lock types 404), and therefore can be performed concurrently by multiple instances (e.g., the instance 110 and the instance 112 simultaneously performing the restore operation 410). In contrast, the host mapping sub-operation 440 and the LUN discovery sub-operation 442 are indicated as having a host-side bus lock 316 as described in FIG. 3, while host entity deactivation sub-operation 436 and the host entity activation sub-operation 444 are indicated as including a host-side filespec lock 314 as described in FIG. 3, according to one embodiment.

The clone operation 412 is illustrated in FIG. 4 as including two non-critical sub-operations (a host entity translation sub-operation 446 and a clone creation sub-operation 450) and four critical sub-operations (a snapshot meta-data management sub-operation 448, a host mapping sub-operation 452, a LUN discovery sub-operation 454, and a host entity activation sub-operation 456), according to one embodiment. The two non-critical sub-operations of the clone operation 412 do not have a lock type (e.g., 'NONE' indicated under lock types 404), and therefore can be performed concurrently by multiple instances (e.g., the instance 110 and the instance 112 simultaneously performing the clone operation 412). In contrast, the snapshot meta-data management sub-operation 448 of the clone operation 412 is indicated as having the storage-side snap lock 318 as described in FIG. 3. The host mapping sub-operation 452 and the LUN discovery sub-operation 454 of the clone operation 412 are indicated as having the bus lock 316 as described in FIG. 3, and the host entity activation sub-operation 456 is indicated as having the filespec lock 314 as described in FIG. 3, according to one embodiment.

The delete operation 414 is illustrated in FIG. 4 as including two non-critical sub-operations (a host entity translation sub-operation 458 and a storage deletion sub-operation 464) and three critical sub-operations (a host entity deactivation sub-operation 460, a host un-mapping sub-operation 462, and a LUN discovery sub-operation 466), according to one embodiment. The two non-critical sub-operations of the delete operation 414 do not have a lock type (e.g., 'NONE' indicated under lock types 404), and therefore can be performed concurrently by multiple instances (e.g., the instance 110 and the instance 112 simultaneously performing the delete operation 414). In contrast, the host un-mapping sub-operation 462 and the LUN discovery sub-operation 466 are indicated as having the bus lock 316 as described in FIG. 3, while the host entity deactivation sub-operation 460 is indicated as including the filespec lock 314 as described in FIG. 3, according to one embodiment.

With this in mind, we return to FIG. 1, where sequences 130, 135, and 140 are illustrated. In the sequence 130, instances 110 and 112 of FIG. 1 perform an operation (e.g., one of the five operations described in FIG. 4) simultaneously. Then, in sequence 135, instance 110 of FIG. 1 acquires a lock (e.g., the filespec lock 314, the bus lock 316, or the snap lock 318 as described in FIGS. 3 and 4) on a critical sub-operation (as described in FIG. 4). Then, in sequence 140 of FIG. 1, it is described that critical sub-operations may be performed exclusively (as described in FIG. 3) while non-critical sub-operations may be performed concurrently (as described in FIG. 3).

FIG. 5 is an exploded view of the host device 102 having a management module 550 coupled with a host processor 538, according to one embodiment. The management module 550 includes a number of sub-modules that correspond to the sub-operations of operations described in FIG. 4 (modules 502 through 530), coupled to one and other through a bus 540 and an interface module 532. The interface module 532 is illustrated as communicating with a user module 534 that may provide a user interface through the host device 102. The application module 536 is coupled with the user module 534 and to the management module 550. The application module 536 may represent collectively the file systems libraries, volume managers, OS commands, etc. that are interacted/invoked by modules 502, 504, 506, 508, 510 and/or 512.

A host entity translation module 502 of FIG. 5 may be used in the backup operation 408, the restore operation 410, the clone operation 412, and the delete operation 414 of FIG. 4 during the host entity translation sub-operations. A host entity freeze module 504 and the host entity unfreeze module 506 may be used in the backup operation 408 of FIG. 4 during the freeze and unfreeze sub-operations. A host entity activation module 508 and a host entity deactivation module 510 may be used in the provisioning operation 406, the restore operation 410, the clone operation 412 and in the delete operation 414 during the host entity activation and deactivation sub-operations.

A discovery module 512 of FIG. 5 may be used during the LUN discovery sub-operations of the provisioning operation 406, the restore operation 410, the clone operation 412, and the delete operation 414 of FIG. 4. A storage LUN creation module 514 of FIG. 5 may be used during the storage LUN creation sub-operation 416 of the provisioning operation 406 of FIG. 4. A storage deletion module 516 may be used during the storage deletion sub-operation 464 of the delete operation 414 of FIG. 4.

A clone creation module 518 of FIG. 5 may be used during the clone creation sub-operation 450 of the clone operation 412 of FIG. 4. A clone deletion module 520 may be used in the storage deletion sub-operation 464 of the delete operation 414 of FIG. 4. A snapshot creation module 522 may be used during the snapshot creation sub-operation 430 of the backup operation 408 of FIG. 4. A snapshot restore module 524 may be used during the snapshot restore sub-operation 438 of the restore operation 410 of FIG. 4.

A host mapping module 526 may be used during the host mapping sub-operation 452 of the clone operation 412 of FIG. 4. A host un-mapping module 528 may be used during the host un-mapping sub-operation 462 of the delete operation 414 of FIG. 4. A snapshot meta-data management module 530 may be used during the snapshot meta-data management operations of the backup operation 408 and the clone operation 412 of FIG. 4.

Figure 6A:
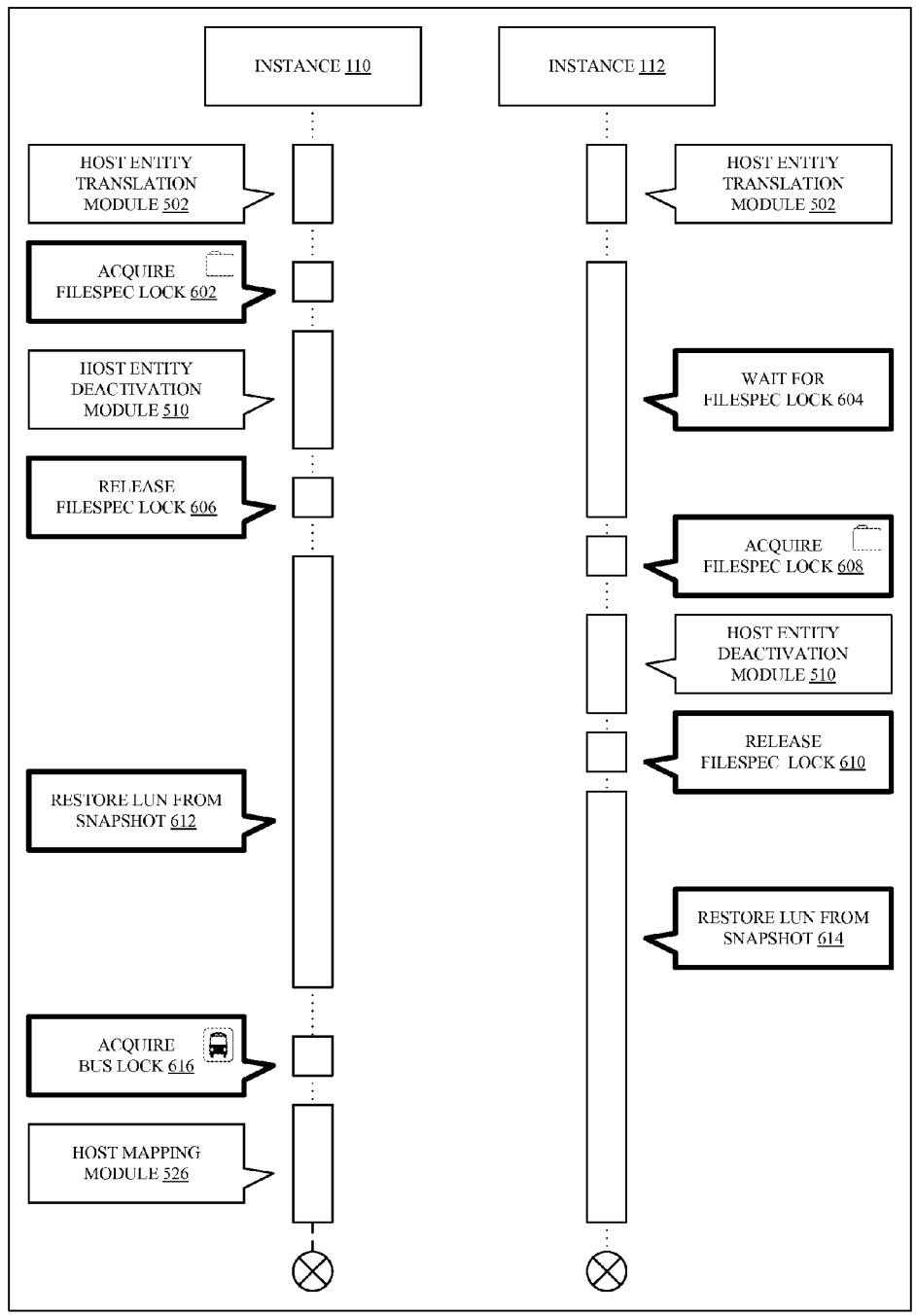
FIG. 6A is a timing diagram illustrating an application of a filespec lock and a bus lock on a host device, according to one embodiment.
Figure 6B:
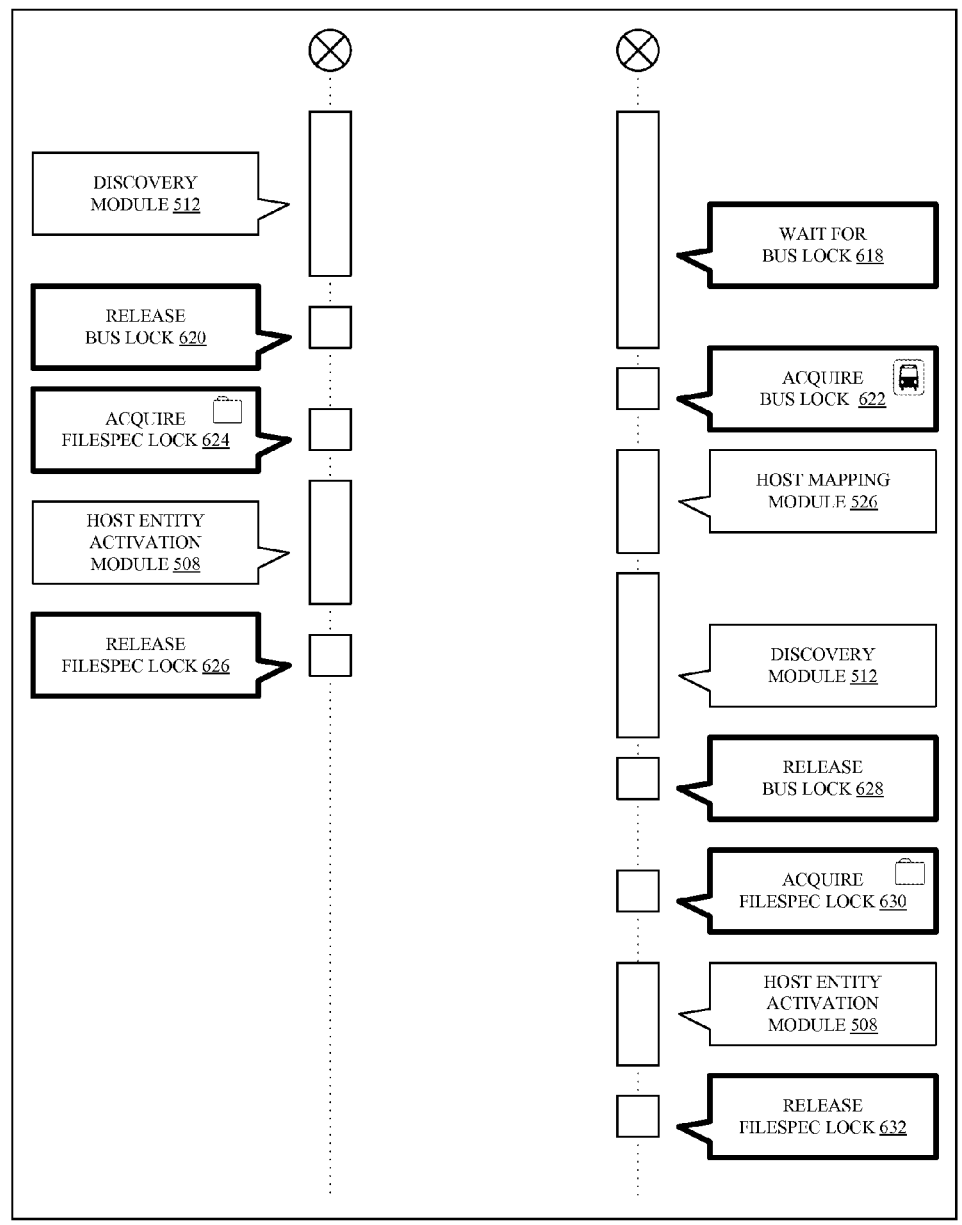
FIG. 6B is a continuation of the timing diagram of FIG. 6A illustrating an application of the filespec lock and the bus lock on the host device, according to one embodiment.

FIG. 6A and FIG. 6B are timing diagrams illustrating an application of a filespec lock 314 and a bus lock 316 on a host device, according to one embodiment. A vertical time axis is illustrated in FIG. 6A. Instance 110 and instance 112 of FIG. 1 both request access to the host entity translation module 502 and concurrently access the host entity translation module 502 because this module is associated with a non-critical sub-operation. Then, Instance 110 acquires the filespec lock 314 in time 602 when it requests a critical sub-operation of the host entity deactivation module 510 (e.g., because it requests this critical sub-operation sooner than instance 112). Instance 112 is forced to wait for the filespec lock 314 to be released by the instance 110 at time 604. Meanwhile, instance 110 accesses the host entity deactivation module 510 exclusively because this module correlates to a critical sub-operation. When instance 110 is complete, it releases the filespec lock 314 at time 606.

Then, instance 112 acquires the filespec lock 314 at time 608 for a critical sub-operation and accesses the host entity deactivation module 510, which is associated with a critical sub-operation. Instance 112 releases the filespec lock 314 at time 610. At that point, both instance 110 and instance 112 restore LUN from snapshot at time 612 and 614. Next, the instance 110 acquires a bus lock 316 at time 616 because of a critical operation associated with the host mapping module 526.

Then, continuing on to FIG. 6B, instance 112 waits for the bus lock 316 to be released by instance 110 at time 618. Instance 110 accesses the discovery module 512 and then releases the bus lock 316 at time 620. Following the release, instance 112 acquires the bus lock 316 at time 622. Then, the host mapping module 526 and the discovery module 512 may be accessed exclusively by instance 112 before instance 112 releases the bus lock 316 at time 628. Meanwhile, at time 624, instance 110 acquires the filespec lock 314 and has exclusive access to the host entity activation module 508 until it releases the filespec lock 314 at time 626. The processes continue onward when instance 112 acquires the filespec lock 314 at time 630 and exclusively accesses the host entity activation module 508 before releasing the filespec lock 314 at time 632.

Figure 7A:
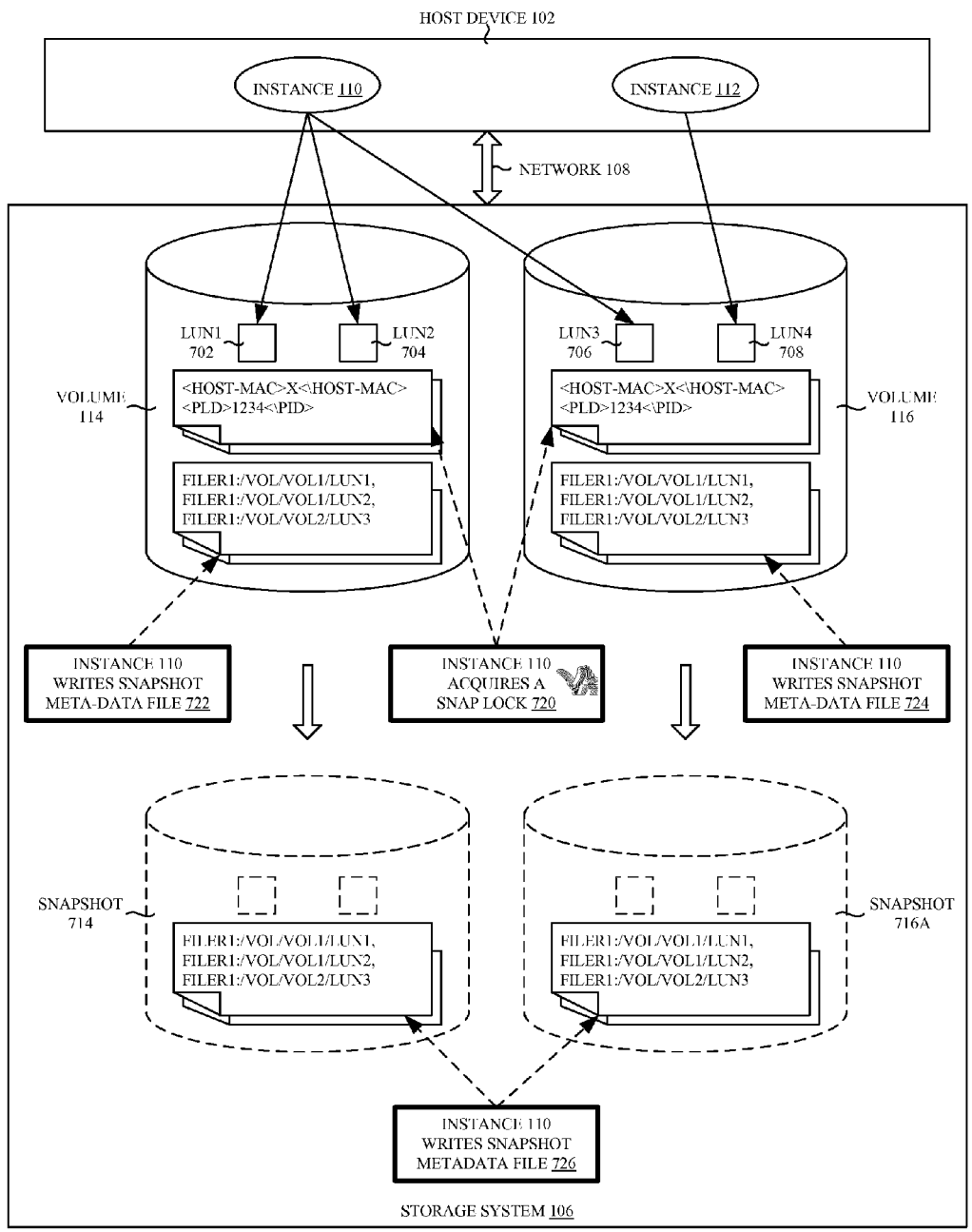
FIG. 7A is a graphical process flow illustrating an application of a snap lock on the storage system, according to one embodiment.

FIG. 7A is a graphical process flow illustrating an application of the snap lock 318 of FIG. 3 on the storage system 106 of FIG. 1, according to one embodiment. In FIG. 7A, instance 110 and the instance 112 of the host device 102 (as previously described in FIG. 1) simultaneously perform an operation on the storage system 106. The file system associated with instance 110 is distributed on three LUNs, 702, 704, and 706 and is spread across two volumes, volume 114 and volume 116 in FIG. 7A. The file system associated with instance 112 is distributed on one LUN 708 and is located only on the volume 116.

Figure 8:
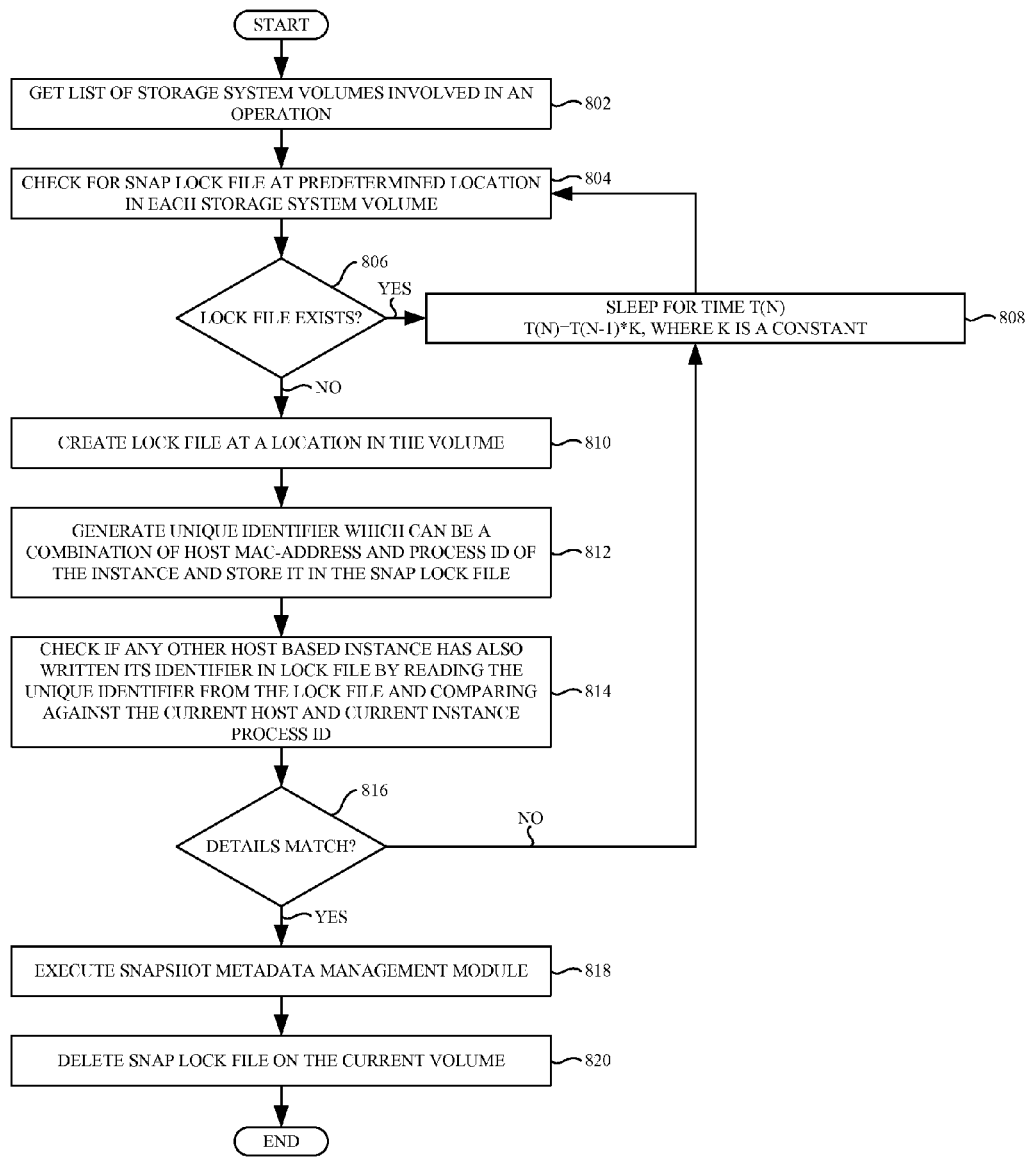
FIG. 8 is process flow describing an application of the snap lock, according to one embodiment.

At time 720, as illustrated in FIG. 7A, instance 110 may acquire the snap lock 318 (e.g., the process of "acquiring snap lock" entails the operations 810, 812, 814, 816 of FIG. 8) by placing a snap lock file (e.g., the snap lock 318) which includes the physical station address (e.g., MAC address) and a process identifier of the instance 110, at some predetermined location of the volume. For example, the MAC address may uniquely identify a host. The process identifier may uniquely identify a process (e.g., an instance) in the host.

During this time, instance 112 may be prevented from creating its own meta-data and inadvertently overwriting the snapshot meta-data of instance 110 because of the snap lock 318. The snapshot meta-data file may include information about the host side entities like, file systems, disk groups, host volumes, and the underlying LUN names. The snapshot meta-data information may be used by the host entity activation module during cloning, and restore operations. Then, at the time 726, instance 110 may take snapshots of the volumes 114 and 116 (snapshot 714 corresponding to volume 114 and snapshot 716A corresponding to volume 116). Once the snapshot creation is complete, the snap lock file may be deleted (as illustrated in the operation 820 of FIG. 8). It should be noted that the process of deleting snap lock file can be called "releasing snap lock". Also note that since instance 112 was prevented from accessing the volume 116 because of the snap lock 318, instance 112 did not inadvertently replace the meta-data placed on volume 116 by instance 110.

Figure 7B:
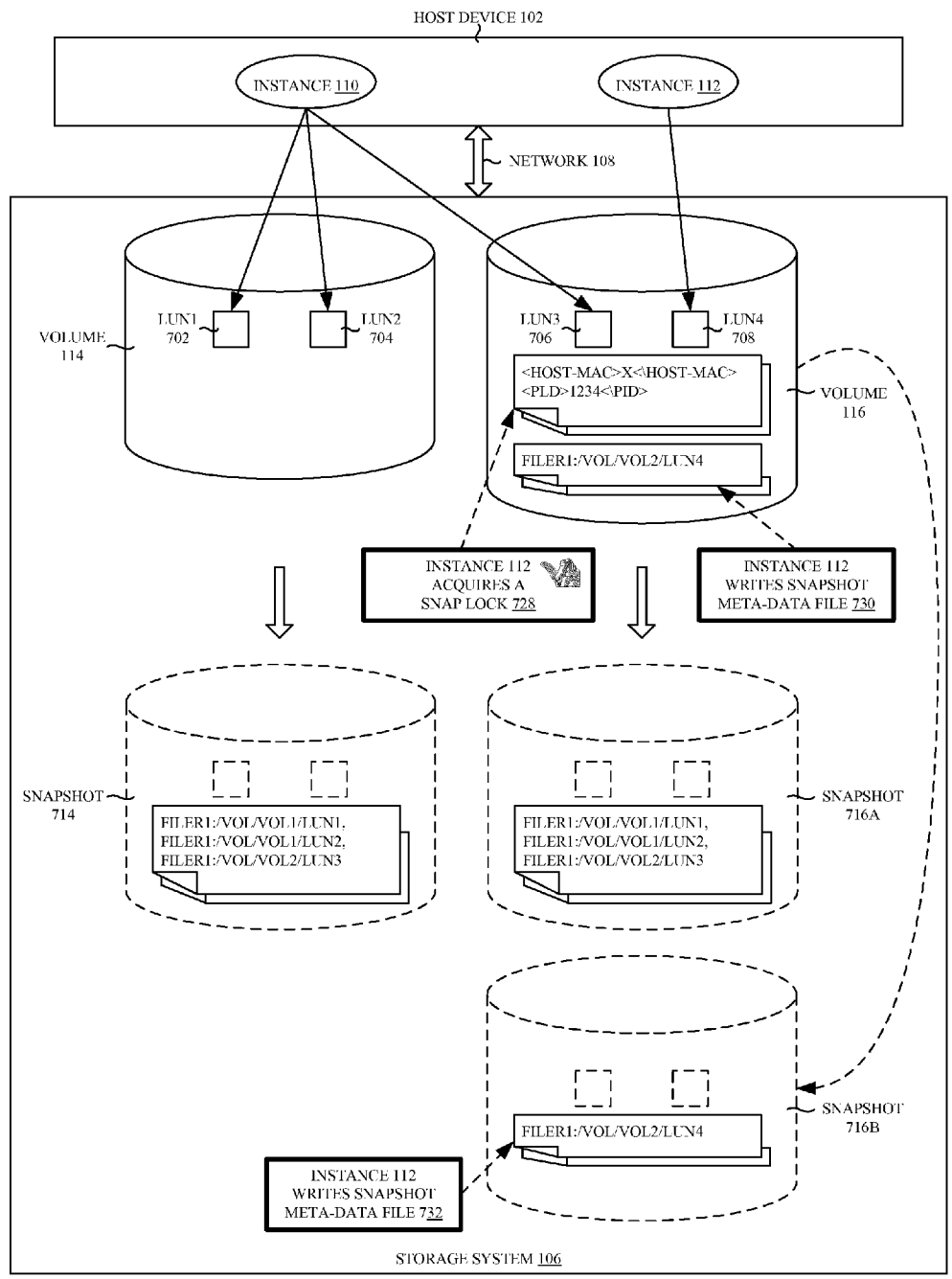
FIG. 7B is a continuation of the graphical process flow of FIG. 7A illustrating an application of the snap lock on the storage system, according to one embodiment.

FIG. 7B is a continuation of the graphical process flow of FIG. 7A illustrating an application of the snap lock 318 on the storage system 106, according to one embodiment. At time 728 on FIG. 7B, instance 112 may look for the snap lock at the predetermined location to ensure no other instance is using the volume. Since the snap lock file placed by instance 110 is removed (snap lock released), instance 112 may acquire the snap lock by placing the snap lock file having the MAC address of the host and the process id of instance 112. Then, at time 730, instance 112 may write the snapshot meta-data file. Next, at time 732, instance 112 may generate a snapshot of the volume 116. Then, the instance 112 may release the snap lock file (e.g., delete the snap lock file from the volume). It should be noted that since the process identifiers were different, two snapshots 716A and 716B were generated for the volume 116 corresponding to two different instances and sets of data, and that the snapshots were not corrupted.

To illustrate this process further, let us consider the following two examples.

CASE 1:

Let us say two instances attempt to perform a backup operation on the same volume (e.g. volume 116) as shown in FIG. 7 at the same time (e.g., simultaneously). First, the two instances may look for the snap lock in the volume. Let us say, both instances find that there is no lock file. So, the instances may attempt to acquire the lock by placing their own lock file. At the end of the attempt operation, only one snap lock file may be present which could belong to either instance.

By reading the snap lock file contents, each instance can check which instance generated the snap file by looking at the MAC address and process identifier. If the contents match, that may mean that the instance (e.g., instance checking the snap file) has written the snap file itself. Then, that instance can acquire the snap lock successfully. In contrast, the other instance will see that the snap file contents are different and written by some other instance. Therefore, the other instance may wait and try again after an interval of time (e.g., may be a process dependent interval of time).

CASE 2:

Let us suppose, instance 1 acquires a lock first (by placing the snap lock file). Later (after sometime time), let us suppose instance 2 attempts to acquire the lock on the same volume. The instance 2 will find that there is a snap lock file already existing. Therefore, instance 2 will wait and try to acquire the lock (place its snap lock file) after some time.

FIG. 8 is process flow describing an application of the snap lock 318, according to one embodiment. In operation 802, a list of storage system volumes (e.g., volumes 114 and 116 in FIG. 1) involved in an operation may be obtained. In operation 804, the snap lock file may be searched at predetermined location in each storage system volume. The snap lock file may include a MAC address and a process identifier. Then, in operation 806, a check can be performed to determine whether a snap lock file exists. If the snap lock file exists, then operation 808 may be initiated. In operation 808, a sleep function may be applied to initiate a sleep function for example for a time T(n) where T(n)=T(n−1) * k, where 'k' may be a constant, and 'n' is a variable. Then, in operation 810, a lock file may be generated at the predetermined time in the volume. Next, in operation 812, a unique identifier can be generated which can be a combination of a host MAC-address and a process identifier of the instance on the host (e.g., as described in FIG. 7). The information associated to the host MAC-address and the process identifier can be stored in the snap lock file. Then, in operation 816, a check can be performed to determine whether any other host based instances have also written their identifier in a lock file. This is accomplished by reading the unique identifier from the lock file and comparing against the current host and current instance process identifier. If the details match, the snapshot meta-data management module can be executed in operation 818 and the snap lock file can be deleted on the current volume in operation 820. If the details do not match, the system may execute a sleep function for a threshold period of time before again checking for a snap lock file in a predetermined location in each store storage system.

Figure 9:
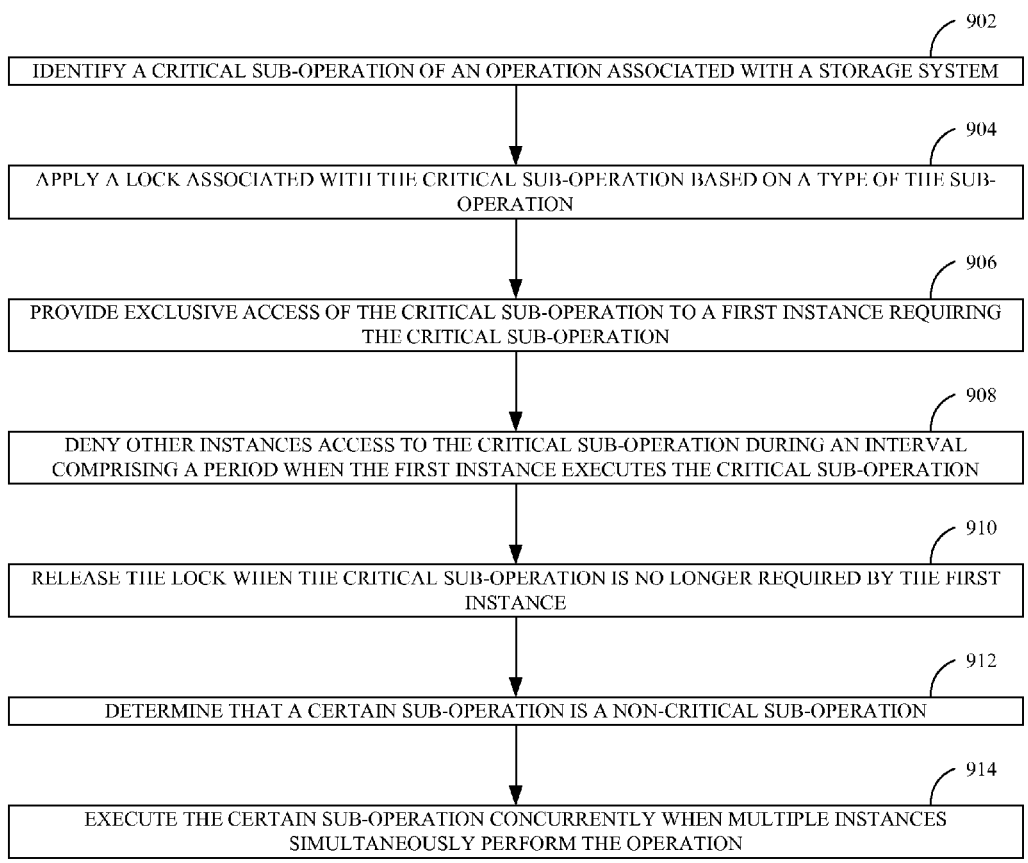
FIG. 9 is a process flow that illustrates applying and releasing a lock of a critical sub-operation, according to one embodiment.

FIG. 9 is a process flow of applying and releasing a lock of a critical sub-operation, according to one embodiment. In operation 902, a critical sub-operation (as described in FIG. 3) of an operation (e.g., as described in FIG. 4) associated with a storage system can be identified. In operation 904, a lock (e.g., as described in FIG. 3) associated with the critical sub-operation may be applied based on a type of the sub-operation. Next, in operation 906, exclusive access of the critical sub-operation may be provided to a first instance requiring the critical sub-operation (e.g., as described in FIG. 3). While the exclusive access is been provided in operation 906, in operation 908, other instances may be denied access to the critical sub-operation during an interval including a period when the first instance executes the critical sub-operation. Next, the lock may be released when the critical sub-operation is no longer required by the first instance in operation 910. Then, it may be determined that a certain sub-operation is not a critical sub-operation in operation 912. In operation 914, the certain sub-operation may be executed concurrently when multiple instances simultaneously perform the operation (e.g., as described in FIG. 3).

Figure 10:
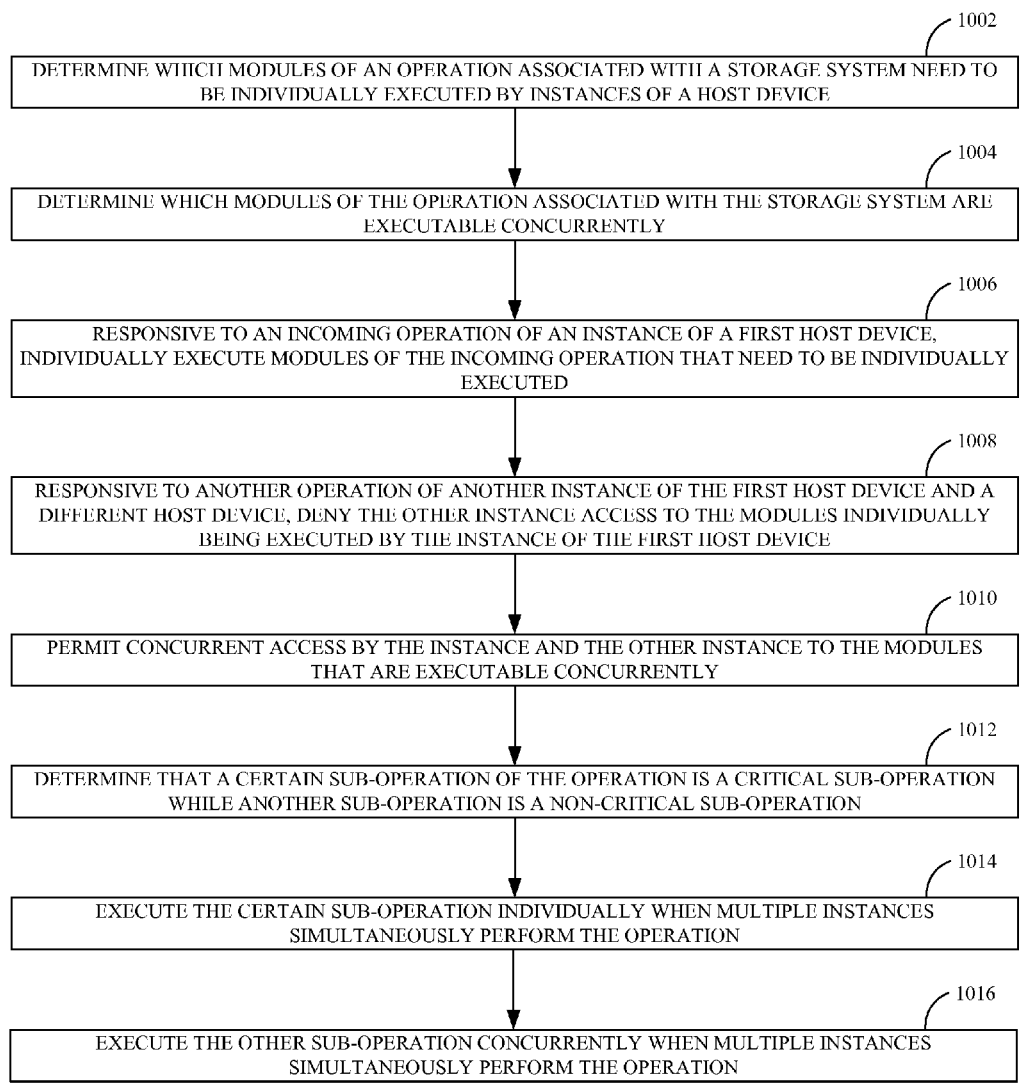
FIG. 10 is a process flow that illustrates determining critical and non-critical sub-operations, according to one embodiment.

FIG. 10 is a process flow of determining critical and non-critical sub-operations, according to one embodiment. In operation 1002, it may be determined which modules of an operation associated with a storage system need to be individually executed by instances of a host device (e.g., as described in FIG. 3). Then, in operation 1004, a determination may be made as to which modules of the operation associated with the storage device may be executable concurrently. Next, in operation 1006, modules of the incoming operations that need to be individually executed can be individually executed in response to an incoming operation of an instance of a first host device.

Then, in operation 1008, the other instance may be denied access to the modules individually being executed by the instance of the first host device. Then, in operation 1010, concurrent access can be permitted by the instance and the other instance to modules that are executable concurrently (e.g., as described in FIG. 3). Next, it may be determined that a certain sub-operation is a critical sub-operation while another sub-operation is a non-critical sub-operation in operation 1012. Then, in operation 1014, the certain sub-operation (e.g., the critical sub-operation) is executed individually (e.g., by providing exclusive access to a first instance by implementing locks as described in FIGS. 3 and 4) when multiple instances simultaneously perform the operation. In operation 1016, the other sub-operation (e.g., the non-critical sub-operation) may be concurrently executed when multiple instances simultaneously perform the operation.

Although the present embodiments have been described with reference to specific example embodiments, it will be evident that various modifications and changes may be made to these embodiments without departing from the broader spirit and scope of the various embodiments. Additionally, the various embodiments described herein may be enabled and operated using hardware circuitry (e.g., CMOS based logic circuitry), firmware, software or any combination of hardware, firmware, or software (e.g., embodied in a machine readable medium). For example, the various electrical structure and methods may be embodied using transistors, logic gates, and electrical circuits (e.g., application specific integrated (ASIC) circuitry or in Digital Signal Processor (DSP) circuitry).

In addition, it will be appreciated that the various operations, processes, and methods disclosed herein may be embodied in a machine-readable medium or a machine accessible medium compatible with a data processing system (e.g., a computer system), and may be performed in any order (e.g., including using means for achieving the various operations). It is also within the scope of an embodiment to implement a program or code that can be stored in a machine-readable medium to permit a computer to perform any of the methods described above.

The above description of illustrated embodiments, including what is described in the abstract, is not intended to be exhaustive or to limit the claims to the precise forms disclosed. While specific embodiments of, and examples for, the claims are described herein for illustrative purposes, various equivalent modifications are possible within the scope of the claims, as those skilled in the relevant art will recognize.

These modifications can be made to the embodiments in light of the above detailed description. The terms used in the following claims should not be construed to limit the claims to the specific embodiments disclosed herein. Rather, the scope of the embodiments is to be determined entirely by the following claims, which are to be construed in accordance with established doctrines of claim interpretation. Accordingly, the specification and drawings are to be regarded in an illustrative rather than a restrictive sense.

What is claimed is:
1. A machine implemented method, comprising:
determining which modules for an operation from among a provisioning operation, a backup operation, a restore operation, a clone operation, and a delete operation on a storage volume of a storage system need to be individually executed by a first instance executed at a host device coupled to the storage system and a second instance executed simultaneously at other host devices sharing the storage system and being executed simultaneously by a number of users operating on different storage volumes of the storage system; wherein the operation includes a critical sub-operation and a non-critical sub-operation, where the critical sub-operation and the non-critical sub-operations vary based on whether the opera- tion is a provisioning operation, a backup operation, a restore operation, a clone operation or a delete operation;

determining which modules for the operation associated with the storage system are executable concurrently;

responsive to an incoming sub-operation for the first instance at the host device, individually executing modules for the incoming sub-operation that need to be individually executed and enabling the first instance to write a metadata file to the storage volume to be utilized during a subsequent operation;

responsive to another sub-operation for the second instance, denying the second instance access to the modules individually being executed by the first instance at the host device by placing a lock file and a process identifier of the the first instance at a predetermined location of the storage volume, and preventing, in accordance with the lock file and the process identifier placed, the second instance from inadvertently overwriting the metadata file written by the first instance; and permitting concurrent access by the first instance and the second instance to the modules that are executable concurrently.

2. The method of claim 1, further comprising: determining the critical sub-operation and the non-critical sub-operation; and executing the non-critical sub-operation concurrently when multiple instances simultaneously perform the operation.

3. The method of claim 1, wherein a type of the critical sub-operation is a snapshot meta-data management sub-operation, and wherein when the type of the critical sub-operation is the snapshot meta-data management sub-operation, a lock applied on the storage volume of the storage system is a snap lock.

4. The method of claim 1, wherein a type of the critical sub-operation is at least one of a host mapping sub-operation, a LUN discovery sub-operation, and a host un-mapping sub-operation, and wherein when the type of the critical sub-operation is at least one of the host mapping sub-operation, the LUN discovery sub-operation, and the host un-mapping sub-operation, a lock applied on at least one of the host device and the other host device is a bus lock.

5. The method of claim 1, wherein a type of the critical sub-operation is at least one of a host volume activation sub-operation, a host volume freeze sub-operation, a host volume unfreeze sub-operation, and a host volume deactivation sub-operation, and wherein when the type of the critical sub-operation is at least one of the host volume activation sub-operation, the host volume freeze sub-operation, the host volume unfreeze sub-operation, and the host volume deactivation sub-operation, a lock applied on at least one of the host device and the other host device is a filespec lock.

6. The method of claim 1, wherein a type of the non-critical sub-operation is at least one of a storage creation sub-operation, a host volume translation sub-operation, a snapshot restore sub-operation, and a storage deletion sub-operation, and wherein when the type of the non-critical sub-operation is at least one of the storage creation sub-operation, the host volume translation sub-operation, the snapshot restore sub-operation, and the storage deletion sub-operation, no lock is applied on at least one of the host device, the other host device and the storage system.

7. The method of claim 1, wherein the storage system includes a non-volatile storage comprising a RAID system, a hard drive, and a flash drive, and wherein the storage system is communicatively coupled to the host device as at least one of a Network Attached Storage (NAS) device, a Storage Area Network (SAN) device, and a Direct Attached Storage (DAS) device.

8. The method of claim 1, wherein the non-critical sub-operation is executed concurrently without using a lock.

9. A non-transitory, machine readable storage medium having stored thereon instructions for performing a method, comprising machine executable code which when executed by at least one machine, causes the machine to:

determine which modules for an operation from among a provisioning operation, a backup operation, a restore operation, a clone operation, and a delete operation on a storage volume of a storage system need to be individually executed by a first instance executed at a host device coupled to the storage system and a second instance executed simultaneously at other host devices sharing the storage system and being executed simultaneously by a number of users operating on different storage volumes of the storage system; wherein the operation includes a critical sub-operation and a non-critical sub-operation, where the critical sub-operation and the non-critical sub-operations vary based on whether the operation is a provisioning operation, a backup operation, a restore operation, a clone operation or a delete operation;

determine which modules for the operation associated with the storage system are executable concurrently;

responsive to an incoming sub-operation for the first instance at the host device, individually execute modules for the incoming sub-operation that need to be individually executed and enable the first instance to write a metadata file to the storage volume to be utilized during a subsequent operation;

responsive to another sub-operation for the second instance, deny the second instance access to the modules individually being executed by the first instance at the host device by placing a lock file and a process identifier of the first instance at a predetermined location of the storage volume, and prevent, in accordance with the lock file and the process identifier, the second instance from inadvertently overwriting the metadata file written by the first instance; and permit concurrent access by the first instance and the second instance to the modules that are executable concurrently.

10. The storage medium of claim 9, further comprising instructions to:

determine the critical sub-operation and the non-critical sub-operation; and execute the non-critical sub-operation concurrently when multiple instances simultaneously perform the operation.

11. The storage medium of claim 9, wherein a type of the critical sub-operation is a snapshot meta-data management sub-operation, and wherein when the type of the critical sub-operation is the snapshot meta-data management sub-operation, a lock applied on the storage volume of the storage system is a snap lock.

12. The storage medium of claim 9, wherein a type of the critical sub-operation is at least one of a host mapping sub-operation, a LUN discovery sub-operation, and a host un-mapping sub-operation, and wherein when the type of the critical sub-operation is at least one of the host mapping sub-operation, the LUN discovery sub-operation, and the host un-mapping sub-operation, a lock applied on at least one of the host device and the other host device is a bus lock.

13. The storage medium of claim 9, wherein a type of the critical sub-operation is at least one of a host volume activation sub-operation, a host volume freeze sub-operation, a host volume unfreeze sub-operation, and a host volume deactivation sub-operation, and wherein when the type of the critical sub-operation is at least one of the host volume activation sub-operation, the host volume freeze sub-operation, the host volume unfreeze sub-operation, and the host volume deactivation sub-operation, a lock applied on at least one of the host device and the other host device is a filespec lock.

14. The storage medium of claim 9, wherein a type of the non-critical sub-operation is at least one of a storage creation sub-operation, a host volume translation sub-operation, a snapshot restore sub-operation, and a storage deletion sub-operation, and wherein when the type of the non-critical sub-operation is at least one of the storage creation sub-operation, the host volume translation sub-operation, the snapshot restore sub-operation, and the storage deletion sub-operation, no lock is applied on at least one of the host device, the other host device and the storage system.

15. The storage medium of claim 9, wherein the storage system includes a non-volatile storage comprising a RAID system, a hard drive, and a flash drive, and wherein the storage system is communicatively coupled to the host device as at least one of a Network Attached Storage (NAS) device, a Storage Area Network (SAN) device, and a Direct Attached Storage (DAS) device.

16. The storage medium of claim 9, wherein the non-critical sub-operation is executed concurrently without using a lock.

17. A system, comprising:
a memory containing machine readable medium comprising machine executable code having stored thereon instructions; and
a processor module coupled to the memory, the processor module configured to execute the machine executable code to:
determine which modules for an operation from among a provisioning operation, a backup operation, a restore operation, a clone operation, and a delete operation on a storage volume of a storage system need to be individually executed by a first instance executed at a host device coupled to the storage system and a second instance executed simultaneously at other host devices sharing the storage system and being executed simultaneously by a number of users operating on different storage volumes of the storage system;
wherein the operation includes a critical sub-operation and a non-critical sub-operation, where the critical sub-operation and the non-critical sub-operations vary based on whether the operation is a provisioning operation, a backup operation, a restore operation, a clone operation or a delete operation;
determine which modules for the operation associated with the storage system are executable concurrently;
responsive to an incoming sub-operation for the first instance at the host device, individually execute modules for the incoming sub-operation that need to be individually executed and enable the first instance to write a metadata file to the storage volume to be utilized during a subsequent operation;
responsive to another sub-operation for the second instance, deny the second instance access to the modules individually being executed by the first instance at the host device by placing a lock file and a process identifier of the first instance at a predetermined location of the storage volume, and prevent, in accordance with the lock file and the process identifier, the second instance from inadvertently overwriting the metadata file written by the first instance; and
permit concurrent access by the first instance and the second instance to the modules that are executable concurrently.

18. The system of claim 17, further comprising, instructions to:
determine the critical sub-operation and the non-critical sub-operation; and
execute the non-critical sub-operation concurrently when multiple instances simultaneously perform the operation.

19. The system of claim 17, wherein a type of the critical sub-operation is a snapshot meta-data management sub-operation, and wherein when the type of the critical sub-operation is the snapshot meta-data management sub-operation, a lock applied on the storage volume of the storage system is a snap lock.

20. The system of claim 17, wherein a type of the critical sub-operation is at least one of a host mapping sub-operation, a LUN discovery sub-operation, and a host un-mapping sub-operation, and wherein when the type of the critical sub-operation is at least one of the host mapping sub-operation, the LUN discovery sub-operation, and the host un-mapping sub-operation, a lock applied on at least one of the host device and the other host device is a bus lock.

21. The system of claim 17, wherein a type of the critical sub-operation is at least one of a host volume activation sub-operation, a host volume freeze sub-operation, a host volume unfreeze sub-operation, and a host volume deactivation sub-operation, and wherein when the type of the critical sub-operation is at least one of the host volume activation sub-operation, the host volume freeze sub-operation, the host volume unfreeze sub-operation, and the host volume deactivation sub-operation, a lock applied on at least one of the host device and the other host device is a filespec lock.

22. The system of claim 17, wherein a type of the non-critical sub-operation is at least one of a storage creation sub-operation, a host volume translation sub-operation, a snapshot restore sub-operation, and a storage deletion sub-operation, and wherein when the type of the non-critical sub-operation is at least one of the storage creation sub-operation, the host volume translation sub-operation, the snapshot restore sub-operation, and the storage deletion sub-operation, no lock is applied on at least one of the host device, the other host device and the storage system.

23. The system of claim 17, wherein the storage system includes a non-volatile storage comprising a RAID system, a hard drive, and a flash drive, and wherein the storage system is communicatively coupled to the host device as at least one of a Network Attached Storage (NAS) device, a Storage Area Network (SAN) device, and a Direct Attached Storage (DAS) device.

24. The system of claim 17, wherein the non-critical sub-operation is executed concurrently without using a lock.

* * * * *